(12) United States Patent
Landon

(10) Patent No.: US 6,544,579 B1
(45) Date of Patent: Apr. 8, 2003

(54) TRANS-ISOMER-FREE FAT BLEND AND A PROCESS FOR FORMING THE TRANS-ISOMER-FREE FAT BLEND

(75) Inventor: Todd Landon, Mound, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

(21) Appl. No.: 09/691,473

(22) Filed: Oct. 18, 2000

Related U.S. Application Data

(60) Provisional application No. 60/160,114, filed on Oct. 18, 1999.

(51) Int. Cl.⁷ .................................................. A23D 9/00
(52) U.S. Cl. ...................................... 426/606; 426/601
(58) Field of Search ................................ 426/601, 606, 426/607

(56) References Cited

U.S. PATENT DOCUMENTS

| | | | |
|---|---|---|---|
| 2,521,242 A | 9/1950 | Mitchell, Jr. ................... 99/118 |
| 2,783,151 A | 2/1957 | Cochran et al. ............... 99/118 |
| 2,970,917 A | 2/1961 | Melnick ....................... 99/122 |
| 2,972,541 A | 2/1961 | Cochran et al. ............... 99/118 |
| 3,108,888 A | 10/1963 | Bugosh ........................ 106/62 |
| 3,369,909 A * | 2/1968 | Schroeder .................... 426/417 |
| 3,549,386 A * | 12/1970 | Menzies et al. |
| 3,563,766 A * | 2/1971 | Matsui ........................ 426/606 |
| 3,694,231 A | 9/1972 | Izzo et al. ..................... 99/115 |
| 3,706,578 A * | 12/1972 | Bence |
| 3,857,985 A * | 12/1974 | Reid et al. ................... 426/417 |
| 3,892,880 A * | 7/1975 | Grolitsch ..................... 426/541 |
| 3,935,321 A * | 1/1976 | Sakler ......................... 426/235 |
| 3,943,259 A * | 3/1976 | Norris ......................... 426/606 |
| 3,973,046 A * | 8/1976 | Mol ............................ 426/98 |
| 3,973,053 A * | 8/1976 | Galusky et al. ............... 426/99 |
| 3,985,911 A * | 10/1976 | Kriz et al. ................... 426/602 |
| 4,161,484 A * | 7/1979 | Van Den Berg ......... 260/428.5 |
| 4,208,445 A | 6/1980 | Cottier et al. ................ 426/607 |
| 4,265,826 A * | 5/1981 | Iida et al. .................... 260/428 |
| 4,335,157 A * | 6/1982 | Varil .......................... 426/606 |
| 4,341,813 A * | 7/1982 | Ward .......................... 426/603 |
| 4,362,758 A * | 12/1982 | MacNeill ..................... 426/603 |
| 4,410,557 A | 10/1983 | Miller ......................... 426/607 |
| 4,507,244 A * | 3/1985 | Von Rappard et al. .. 260/428.5 |
| 4,753,812 A | 6/1988 | Wilson et al. ................ 426/250 |
| 4,839,190 A | 6/1989 | Bumbalough ................ 426/603 |
| 4,839,191 A | 6/1989 | Luddy et al. ................ 426/607 |
| 4,889,740 A * | 12/1989 | Price .......................... 426/417 |
| 4,952,224 A * | 8/1990 | Lilakos ........................ 62/534 |
| 5,132,125 A | 7/1992 | Lew et al. .................... 426/93 |
| 5,133,902 A | 7/1992 | Sankaran ..................... 554/169 |
| 5,171,604 A | 12/1992 | Weyland et al. ............. 426/607 |
| 5,180,716 A | 1/1993 | Yaksh et al. .................. 514/58 |
| 5,395,531 A * | 3/1995 | Degen et al. ................ 210/636 |
| 5,401,867 A * | 3/1995 | Sitzmann et al. ........... 554/211 |
| 5,470,598 A | 11/1995 | Scavone ..................... 426/607 |
| 5,888,575 A * | 3/1999 | Lansbergen et al. ........ 426/610 |
| 5,908,655 A | 6/1999 | Doucet ....................... 426/606 |
| 5,958,499 A | 9/1999 | Desai et al. ................. 426/606 |
| RE36,390 E * | 11/1999 | Fels et al. ...................... 62/68 |
| 6,033,703 A | 3/2000 | Roberts et al. .............. 426/312 |
| 6,060,028 A * | 5/2000 | Yoneda et al. ............ 422/245.1 |
| 6,069,263 A * | 5/2000 | Yoneda et al. .............. 554/211 |
| 6,083,548 A | 7/2000 | Berntsen ..................... 426/530 |
| 6,093,429 A | 7/2000 | Monsalve et al. ........... 426/107 |
| 6,265,595 B1 * | 7/2001 | Taniguchi et al. ........... 554/208 |

FOREIGN PATENT DOCUMENTS

| | | |
|---|---|---|
| WO | WO 00/33668 | 6/2000 |
| WO | WO 00/36923 | 6/2000 |

OTHER PUBLICATIONS

Best, Daniel, Fats and Oils Crystallize Formulation Opportunities, Prepared Foods, May 1988, pp. 168–170.

Weiss, Theodore J., Ph.D., Food Oils and Their Uses, Second Edition, 1983, pp. 1–21, 92–97, AVI Publishing Co., Inc., Westport CT.

Process Equipment, New scraped surface heat exchanger, data sheet obtained from Internet on May 14, 1999 at http://www.foodexplorer.com/MANU/lit/FE038SLq.htm, (1 page).

Hydrocarbon Online, Scraped Surface Heat Exchangers, data sheet obtained from Internet on May 14, 1999 at http://news.hydrocarbononline.com/product–releases/19971204–408.html, pp. 1–2.

Food Technology, Heat Treatment and Batch Preparation, data sheet obtained from Internet on Jun. 14, 1999 at http:/www.armfield.co.uk/food.html, pp. 1–8.

Twenty Facts About Cottonseed Oil, Fact Sheet obtained from Internet on Jun. 18, 1999 at http:/www.cottonseed-.com/factsht.htm, pp. 1–2.

* cited by examiner

*Primary Examiner*—Carolyn Paden
(74) *Attorney, Agent, or Firm*—Kinney & Lange, P.A.

(57) ABSTRACT

A method of processing a liquid fat component and a solid fat component that includes heating a mixture that includes the liquid fat component and the solid fat component to form a liquified fat blend and rapidly cooling the liquified fat blend under agitation in a cooling apparatus to form a nucleated fat base blend, the time between entry of the liquified fat blend into the cooling apparatus and exit of the nucleated fat base blend from the cooling apparatus being about 30 seconds, or less.

99 Claims, 3 Drawing Sheets

TRANS-ISOMER-FREE FAT BLEND AND A PROCESS FOR FORMING THE TRANS-ISOMER-FREE FAT BLEND

CROSS-REFERENCE TO RELATED APPLICATION(S)

Application Ser. No. 60/160,114 filed on Oct. 18, 1999.

BACKGROUND OF THE INVENTION

The present invention generally relates to fat base blends and to a method of making fat base blends. More specifically, the present invention relates to fat base blends with improved processing, stability, nutritional, and mouth-feel characteristics and to a method of making improved fat base blends. The present invention further relates to a method of crystallizing fat base blends.

During the last several years, consumer interest in the amount of trans-isomers of unsaturated fatty acids present in food products has increased. Some scientists believe that trans-isomers of unsaturated fatty acids in the diet may contribute to higher levels of cholesterol in the blood (hypercholesterolemia). Trans-isomers of unsaturated fatty acids are typically formed during processing of fats and fat blends that contain unsaturated fatty acids, such as during hydrogenation of the fats or fat blends to improve the stability of the fats or fat blends.

Food manufacturers often employ a variety of different fats in a particular food product to attain a balance of properties contributed by the different fats. Different fats are often combined to form a fat blend that is subsequently incorporated in food products during manufacture. These fat blends are often referred to as fat base blends in the food manufacturing industry.

The processing and nutritional characteristics of fat base blends are important for providing particular functional qualities, including stability and mouth-feel, to food products, such as microwavable popcorn. Food manufacturers want fat base blends that exhibit good stability, such as minimal, if any, levels of wicking. As used herein, wicking means leakage of liquid fat out of a fat-containing material, food product, or food component, such as a fat base blend. Wicking may occur during storage and transportation of food products, such as microwavable popcorn, that incorporate a fat base blend. Wicking is undesirable because the liquid fat that leaks out of the food product may stain product packaging. Also, wicking of liquid fat from a fat base blend may alter the composition of food products or food components that incorporate the fat base blend.

Food manufacturers also want fat base blends that exhibit little, if any, waxy mouth-feel during consumption of food products that contain the fat base blends. Eating food that has a waxy mouth-feel has been compared to the undesirable sensation of eating wax. In the past, food manufacturers have included trans-isomers of unsaturated fatty acids as part of fat base blends in food products to help minimize wicking of liquid fat and to minimize waxy mouth-feel in food products, such as microwavable popcorn. However, because of the concerns about the possible health effects of trans-isomers of unsaturated fatty acids, another approach is needed that minimizes or eliminates trans-isomers of unsaturated fatty acids, minimizes wicking of liquid fat, and minimizes waxy mouth-feel in fat base blends.

Development of a fat base blend that minimizes or eliminates trans-isomers of unsaturated fatty acids, minimizes wicking of liquid fat, and minimizes waxy mouth-feel is a challenging task that others have not successfully accomplished due to the problem of competing variables. For example, existing fat base blends that contain little, if any, trans-isomers of unsaturated fatty acids typically manifest a waxy mouth-feel and do not satisfactorily address concerns of food manufacturers about wicking of liquid fat from fat base blends that are included in food products. As another example, fat base blends are sometimes formulated to include interesterified fats. Interesterified fats, while sometimes helping to minimize trans-isomers of unsaturated fatty acids, are expensive and do not satisfactorily address concerns of food manufacturers about wicking of liquid fat from fat base blends that are included in food products. Consequently, food manufacturers continue to search for a fat base blend that (1) contains little, if any, trans-isomers of unsaturated fatty acids, (2) consistently minimizes wicking of liquid fat, and (3) does not impart a waxy mouth-feel when incorporated into food products, such as microwavable popcorn. The present invention satisfies these needs of food manufacturers.

BRIEF SUMMARY OF THE INVENTION

The present invention concerns a method of processing a liquid fat component and a solid fat component. The method includes heating a mixture that includes the liquid fat component and the solid fat component to form a liquified fat blend and rapidly cooling the liquified fat blend under agitation in a cooling apparatus to form a nucleated fat base blend. The time between entry of the liquified fat blend into the cooling apparatus and exit of the nucleated fat base blend from the cooling apparatus is about 30 seconds, or less. The present invention further includes a nucleated fat base blend and a fat crystalline material.

DETAILED DESCRIPTION

The present invention generally relates to fat crystalline products that (1) contain little, if any, trans-isomers of unsaturated fatty acids, (2) minimize, and even eliminate, wicking of liquid fat, and (3) impart little if any waxy mouth-feel to food products that incorporate the fat crystalline products. The present invention also relates to a method of making fat crystalline products. The fat crystalline products may be included as a component of any food product, such as microwavable popcorn. According to the method of the present invention, a liquid fat composition that includes little, if any, trans-isomers of unsaturated fatty acids, is physically entrapped or fixed within a crystalline matrix of a solid fat composition that includes little, if any, trans-isomers of unsaturated fatty acids, to form fat crystalline products of the present invention.

Figure 1:
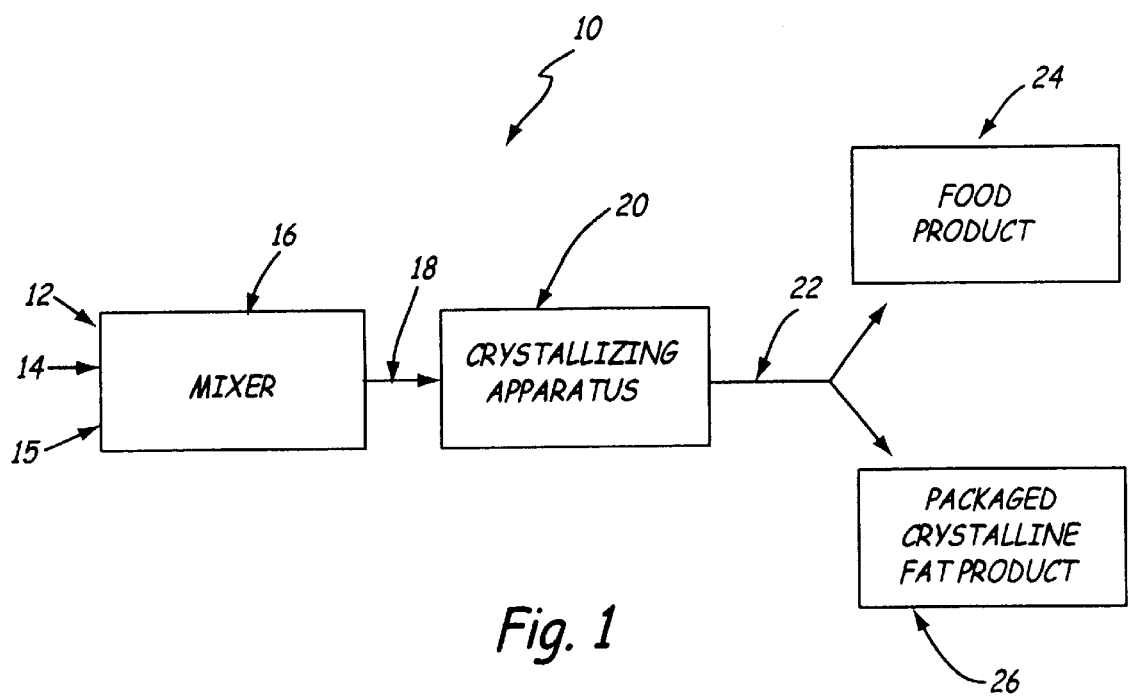
FIG. 1 is a schematic of a process for producing fat base blends in accordance with the present invention.

A process for producing the inventive fat crystalline product is generally depicted at 10 in FIG. 1. In the process 10, a liquid fat composition 12, a solid fat composition 14, and optional additive(s) 15 are introduced into a mixer 16 and are homogeneously blended together in the mixer 16 to form a liquid fat blend 18. The solid fat composition 14 and any solid fat components of the optional additive(s) 15 are melted in the mixer 16 to remove all, or essentially all, crystalline memory of fat crystalline components that are added to the mixer 16. Consequently, all, or essentially all, fat crystalline structures and fat crystal nuclei of the liquid fat composition 12 and the solid fat composition 14 are liquified, and all or essentially all fat crystalline structures and fat crystal nuclei of the optional additive(s) 15 that are capable of melting at the temperatures present in the mixer 16 are liquified. All fat crystalline structures and fat crystal nuclei of the liquid fat composition 12, the solid fat composition 14, and the optional additive(s) 15 are preferably liquified and lose any crystalline memory to minimize, and preferably eliminate, any premature fat crystal formation in the liquid fat blend 18 before fat crystal formation is desired.

The liquid fat blend 18 is transferred from the mixer 16 into a crystallizing apparatus 20. The liquid fat blend 18 is subjected to conditions in the crystallizing apparatus 20 that initiate at least partial crystallization, or nucleation, of crystallizable fat components of the liquid fat blend 18 and consequently form the nucleated fat base blend 22. Initiation of at least partial crystallization, or nucleation, of crystallizable fat components of the liquid fat blend 18 entails nascent formation and/or development of fat crystal nuclei that are sufficient to support further fat crystal growth and fat crystalline structure development once the flow rate of the nucleated fat base blend 22 is substantially reduced or flow of the nucleated fat base blend 22 is ceased completely.

The liquid fat blend 18 is preferably cooled at a high rate under a high degree of agitation in the crystallizing apparatus 20 that is sufficient to cause formation of a large number of fat crystal nuclei, or fat seed crystals, in the nucleated fat base blend 22 that leaves the crystallizing apparatus 20. The cooling rate in the crystallizing apparatus 20 is preferably sufficient to supercool the liquid fat blend 18 and, consequently, the nucleated fat base blend 22 that leaves the crystallizing apparatus 20. The agitation in the crystallizing apparatus 20 is preferably sufficient to homogeneously disperse all fat crystal nuclei that are formed in the liquid fat blend 18 during the processing in the crystallizing apparatus 20. The agitation in the crystallizing apparatus 20 should also be sufficient to minimize, and more preferably prevent, further development of the fat crystal nuclei that are formed in the crystallizing apparatus 20 into strong crystalline structures or a strong crystalline matrix that would inhibit or prevent subsequent pumping of the nucleated fat base blend 22 as a fluid. Furthermore, the nucleated fat base blend 22, upon exiting the crystallizing apparatus 20, should be maintained under conditions, such as turbulent flow conditions, that are effective to delay, until desired, development of the fat crystal nuclei in the nucleated fat base blend 22 into strong crystalline structures or a strong crystalline matrix that would inhibit or prevent pumping of the nucleated fat base blend 22 as a fluid.

The nucleated fat base blend 22 may be directly incorporated into food products 24, such as microwavable popcorn. Alternatively, after exiting the crystallizing apparatus 20, the nucleated fat base blend 22 may be placed into packages to form a packaged fat crystalline product 26. After the flow rate of the nucleated fat base blend 22 has been allowed to drop into the laminar flow region, or the nucleated fat base blend 22 stops flowing, the nucleated fat base blend 22 quickly begins a transformation into a fat crystalline product. This transformation entails growth of the fat crystal nuclei of the nucleated fat base blend 22 into a fat crystalline matrix and a consequent viscosity increase as the nucleated fat base blend 22 is transformed into the fat crystalline product.

Thus, for example, the nucleated fat base blend 22 will typically begin the transformation into the fat crystalline product immediately after the nucleated fat base blend 22 has been incorporated into the food product 24, such as microwavable popcorn, and flow of the nucleated fat base blend 22 has ceased or essentially ceased. As another example, the nucleated fat base blend 22 will typically begin the transformation into the fat crystalline product immediately after the nucleated fat base blend 22 has been packaged and flow of the nucleated fat base blend 22 has ceased or essentially ceased. The nucleated fat base blend 22 thus begins the transformation into the fat crystalline product (as the packaged fat crystalline product 26) immediately after the nucleated fat base blend 22 has been packaged.

The fat crystalline product includes both liquid fat components and solid fat components. As used herein, the term "liquid fat component" means fat components that originate in the liquid fat composition 12, in the solid fat composition 14, and/or in the optional additive(s) 15 and that are liquid at room temperatures of about 72° F. As used herein, the term "solid fat component" means fat components that originate in the liquid fat composition 12, in the solid fat composition 14, and/or in the optional additive(s) 15 and that are solid (or paste-like) at room temperatures of about 72° F. Most of the liquid fat components of the fat crystalline product typically originate in the liquid fat composition 12, and most of the solid fat components of the fat crystalline product typically originate in the solid fat composition 14.

The fat crystalline matrix of fat crystalline structures in the fat crystalline product forms rather quickly. In fact, the fat crystalline matrix typically is substantially formed with just a few minutes, such as about five to about ten minutes, after flow of the nucleated fat base blend 22 is stopped or essentially stopped. Fat crystalline structures that develop in the fat crystalline product physically entrap liquid fat components. The fat crystalline matrix of fat crystalline structures in the fat crystalline product have surprisingly been found to develop, after only about five to about ten minutes of development, to a degree that is adequate to entrap most, if not all, of the liquid fat components of the fat crystalline product and consequently greatly minimizes, if not fully eliminating, wicking of liquid fat components from the fat crystalline product. As minor additional development of the fat crystalline matrix in the fat crystalline product continues after the initial development period of about five to about ten minutes, any remaining wicking of the fat crystalline product is further reduced, typically to non-detectable levels. Also, by properly selecting components of the liquid fat blend 18 with minimal, if any, content of trans-isomers of unsaturated fatty acids, trans-isomers of unsaturated fatty acids may be minimized in, and are preferably fully eliminated from, the fat crystalline product. Surprisingly, the fat crystalline product and food products, such as microwavable popcorn, that incorporate the fat crystalline product exhibit minimal, if any, waxy mouth-feel, even though the content of trans-isomers of unsaturated fatty acids, is minimized in, and preferably fully eliminated from, the fat crystalline product.

It is thought that the minimized, or even eliminated, liquid fat wicking and waxy mouth-feel properties of the fat crystalline product, that are surprisingly achieved, even though the content of trans-isomers of unsaturated fatty acids is minimized in, and preferably fully eliminated from, the fat crystalline product, are achieved due to a novel and unique fat crystalline matrix that is formed in the fat crystalline product. Though not wishing to be bound by theory, it is believed that the crystalline matrix of the fat crystalline product of the present invention includes crystalline structure components that are derived from or include gamma fat crystalline structures and may also include other fat crystalline structure components that are derived from or include other fat crystalline structures, such as beta fat crystalline structures, beta-prime fat crystalline structures, alpha fat crystalline structures, or any combination of any of these. Those of ordinary skill in the art are capable of determining the types of fat crystalline structures, such as beta, beta-prime, alpha, and/or gamma fat crystalline structures, that are present in the fat crystalline product at a particular time by reference to standard x-ray diffraction patterns that are characteristic of different fat crystalline structures. Ultimately, all, or essentially all, fat crystalline structure components of the fat crystalline matrix of the fat crystalline product evolve from the fat crystal nuclei that form as a result of the novel supercooling and agitation conditions that are present in the crystallizing apparatus 20, no matter how the fat crystalline structure components of the fat crystalline matrix of the fat crystalline product are characterized.

While at least some of the solid fat composition 14 and, optionally, a small amount of the liquid fat composition 12 undergo phase changes and crystalline morphology changes in the process 10, none of the components of the liquid fat composition 12, none of the components of the solid fat composition 14, and none of the components of the optional additive(s) 15 are believed to undergo any molecular chemical changes while, or after, progressing through the process 10. Surprisingly, it is believed that some or all of the fat crystalline structure components that initially form, as the liquid fat blend 18 is transformed into the fat crystalline product, may begin as gamma fat crystalline structures that may thereafter change structural form to other fat crystalline structures, such as beta fat crystalline structures, beta-prime fat crystalline structures, alpha fat crystalline structures, or any combination of any of these.

In one preferred embodiment, the liquid fat composition 12, the solid fat composition 14, and the optional additive(s) 15 are introduced into the mixer 16 in accordance with the component concentration ranges specified in Table 1 below:

TABLE 1

| Components | Concentration (Weight Percent)* |
| --- | --- |
| Liquid fat composition 12 | about 82 to about 90 |
| Solid fat composition 14 | about 5 to about 10 |
| Optional additive(s) 15# | about 3 to about 8 |

*based on the total weight of the liquid fat base blend 18
optional additive(s) 15 may be included as part of the liquid fat composition 12, the solid fat composition 14, or both the liquid fat composition 12 and the solid fat composition 14 or may be separately added as optional additive(s) 15.

The liquid fat composition 12 may include one or more fats that are derived from a number of different fat sources such as animal fat sources, plant fat sources, genetically-bred fat sources, bio-engineered fat sources, microbial fat sources, and any combination of any of these. Preferably, the liquid fat composition 12 is a liquid at a temperature of about 72° F. Some non-exhaustive examples of suitable animal-derived fats that may be incorporated in the liquid fat composition 12 include marine oils, such as oils from herring, menhaden, pilchard, sardines, whales, and any of these in any combination. Some non-exhaustive examples of suitable plant-derived fats that may be incorporated in the liquid fat composition 12 include soybean oil, cottonseed oil, corn oil, peanut oil, sunflower oil, safflower oil, olive oil, palm oil, and any of these in any combination. One preferred form of the liquid fat composition 12 is High Oleic CV-65 canola oil, that is available from Cargill Inc. of Minnetonka, Minn. Preferably, none of the marine oils and none of the plant-derived oils that may be incorporated in the liquid fat composition 12 have been either partially or fully hydrogenated.

The solid fat composition 14 may also include one or more fats that are derived from animal fat sources, plant fat sources, genetically-bred fat sources, bio-engineered fat sources, microbial fat sources, and any combination of any of these. Any of the examples of fats listed above as suitable for use in the liquid fat composition 12 and that are solid at a temperature of about 72° F. are suitable for use in the solid fat composition 14. Any of the fats that are incorporated in the solid fat composition 14 may be partially or fully hydrogenated. The solid fat composition 14 may optionally be, or include a blend of fully hydrogenated fats that are capable of forming fat crystalline structures in accordance with the present invention. One preferred form of the solid fat composition 14 is a blend of fully hydrogenated fats that are solid at a temperature of about 72° F. Another preferred form of the solid fat composition 14 is the Stable Flake C® cottonseed stearine product that is available from C. & T. Refinery, Inc. of Richmond, Va.

The liquid fat composition 12 and the solid fat composition 14 may optionally be supplied together as a fat mixture. This fat mixture of the liquid fat composition 12 and the solid fat composition 14 may be based upon (1) a small amount of fully hydrogenated fatty acids, such as about 10 weight percent, or less, fully hydrogenated fatty acids, based on the total weight of the fat mixture, and (2) any liquid fat, such as any of the fats that are listed above as suitable for use in the liquid fat composition 12.

Some non-exhaustive examples of the optional additive(s) 15 include food grade colorants, such as red 1 dye, red 40 dye, yellow 5 dye, yellow 6 dye, and blue 1 dye; natural and synthetic flavors; salt; preservatives such as butylated hydroxytoluene (BHT), butylated hydroxyanisole (BHA), tertiary butylhydroquinone (TBHQ), ethylenediaminetetracetic acid (EDTA), tocopherols, and citric acid; and plant extracts, such as ginseng, garlic, ginger, rosemary, and thyme; and any of these in any combination. Preferably, high fat butter that is available from Land O'Lakes, Inc. of Arden Hills, Minn. is added as a part of the optional additive(s) 15 to impart flavor to the fat crystalline product of the present invention.

Additionally, the liquid fat composition 12, the solid fat composition 14, and any included optional additive(s) 15 contain little, and preferably no, components that may or do interfere with formation of fat crystalline structures in the process 10 after the liquid fat blend 18 enters the crystallizing apparatus 20. Consequently, the liquid fat blend 18 contains little, and preferably no, non-fat crystalline components, such as salt.

Furthermore, emulsifying agents, such as mono-glycerides, distilled mono-glycerides, di-glycerides, distilled di-glycerides, and lecithin are preferably excluded from the liquid fat composition 12, the solid fat composition 14, and the optional additive(s) 15, since emulsifying agents are not required for formation of either fat crystalline structures in the nucleated fat base blend 22 or the crystalline matrix in the fat crystalline product. Nonetheless, it is permissible to use any emulsifying agent, such as mono-glycerides, distilled mono-glycerides, di-glycerides, distilled di-glycerides, and lecithin, so long as the selected emulsifying agent(s) do not interfere with, or otherwise inhibit, formation and/or development of fat crystal nuclei, fat crystalline structures, and/or fat crystalline matrices in the process 10 after the liquid fat blend 18 enters the crystallizing apparatus 20. The term "emulsifying agents" does not include any component(s) of butter that, as part of the butter, are added as optional additive(s) 15.

As used herein, all references to "butter" are to be understood as referring to a dairy product prepared by churning, or equivalently processing, milk, cream, or a combination of milk and cream, though other minor optional ingredients beyond milk and/or cream, may optionally be included before, during and/or after the butter production, unless otherwise indicated. Preferably, the minor optional additional ingredients include only salt, coloring agents, and/or vitamins. The churning or equivalent processing may be accomplished in either batch-wise or continuous fashion. The source of the milk and/or cream that is used to form the butter may be bovine, ovine, caprine, or the like. The butter that may be included as a component of the liquid fat blend 18 may generally take any form, such as semi-solid, pumpable butter that exits the churning process; chilled solid butter; or butter that has been melted to form liquid butter.

For labeling purposes, any butter incorporated in the liquid fat blend 18 is preferably butter that is recognized as butter in the United States by regulatory authorities, such as the Department of Agriculture (U.S.D.A.). The U.S.D.A. defines butter as follows:

> The food product usually known as butter, and which is made exclusively from milk or cream, or both, with or without additional coloring matter, and containing not less than 80 percent by weight of milkfat, all tolerances having been allowed for.

7 C.F.R. §58.305(a), revised Jan. 1, 1997. Generally, however, butter that is incorporated in the liquid fat blend 18 may contain or may consist of any butter, such as butter formed by churning. This means that butter present in the liquid fat blend 18 will typically have a butterfat concentration of at least about 60 weight percent, based on the total weight of the butter leaving the butter production process, since the aggregation of milk fat molecules into the "butterfat" matrix that entraps water molecules will typically not form if the milk fat concentration of the in-process dairy material that is transformed into butter is less than about 60 weight percent, based on the total weight of the in-process dairy material.

The mixer 16 may be any mixing apparatus that is capable of homogeneously blending the liquid fat composition 12, the solid fat composition 14, and the optional additive(s) 15, while simultaneously causing all or essentially all fat crystalline structures and fat crystal nuclei of the liquid fat composition 12, of the solid fat composition 14, and of the optional additive(s) 15 to fully melt. To enhance the likelihood that all fat crystal nuclei with high melting points that are present in the compositions 12, 13 or in the optional additive(s) 15 will be melted, it is very important to insure that the mixing apparatus selected for the mixer 16 is capable of homogeneously dispersing, and is operated to homogeneously disperse, all fat crystal nuclei with high melting points throughout the contents of the mixer 16.

The contents of the mixer 16 are preferably heated to a temperature in excess of about 150° F. in the mixer 16 to liquify essentially all, such as more than about 99.5 weight percent, of any fat crystalline structures and fat crystal nuclei present in the liquid fat composition 12, the solid fat composition 14 and the optional additive(s) 15. More preferably, all of the fat crystalline structures and fat crystal nuclei that are present in the liquid fat composition 12, solid fat composition 14, and/or the optional additive(s) 15 are melted and thereby liquified in the mixer 16 to eliminate any memory of fat crystallization in all components of the liquid fat blend 18.

The amount of trans-isomers of unsaturated fatty acids in the liquid fat blend 18 may be minimized, or eliminated, by ensuring that the liquid fat composition 12, the solid fat composition 14 and the optional additive(s) 15 contain little, if any, trans-isomers of unsaturated fatty acids. The liquid fat blend 18 preferably contains no components that may or do interfere with formation of fat crystalline structures in the process 10 after the liquid fat blend 18 enters the crystallizing apparatus 20. Furthermore, the liquid fat blend 18 preferably contains less than about 10 weight percent of trans-isomers of unsaturated fatty acids, based on the total weight of the liquid fat blend 18. More preferably, the liquid fat blend 18 contains less than about 5 weight percent of trans-isomers of unsaturated fatty acids, based on the total weight of the liquid fat blend 18. Still more preferably, the liquid fat blend 18 contains less than about 0.5 weight percent of trans-isomers of unsaturated fatty acids, based on the total weight of the liquid fat blend 18. Most preferably, the liquid fat blend 18 contains no trans-isomers of unsaturated fatty acids.

Also, it is desirable for food products that incorporate the nucleated fat base blend 22 (or the fat crystalline product upon formation of the fat crystalline matrix) to be capable of being labeled as free of trans-isomers of unsaturated fatty acids. Therefore, the level of trans-isomers of unsaturated fatty acids in the nucleated fat base blend 22, and consequently in the fat crystalline product, is preferably low enough to allow labels that are based upon "serving size" on food products incorporating the nucleated fat base blend 22, and consequently the fat crystalline product, to state that each serving of the food product is free of trans-isomers of unsaturated fatty acids.

The definition of "serving size" varies from country to country. For example, in the United States, "serving size" is defined in the regulations of the United States Food and Drug Administration (U.S.F.D.A) (presently at 21 C.F.R. §101.9(b) and 21 C.F.R. §101.12), which are hereby incorporated by reference. Likewise, the amount of trans-isomers of unsaturated fatty acids per serving size of food product that is permitted while still allowing the food product to be labeled as free of trans-isomers of unsaturated fatty acids varies from country to country. Food products that incorporate the nucleated fat base blend 22, and consequently the fat crystalline product, preferably contain from about 0 grams to about 1 gram of trans-isomers of unsaturated fatty acids per serving (as defined by the U.S.F.D.A) and more preferably contain less than about 0.05 grams of trans-isomers of unsaturated fatty acids per U.S.F.D.A.-defined serving.

The crystallizing apparatus 20 initiates and promotes formation of the fat crystalline structures that are based on solid fat components originally present in the liquid fat composition 12, the solid fat composition 14, and/or the optional additive(s) 15. Some suitable examples of the crystallizing apparatus 20 are the Votator® series of scraped surface heat exchangers that are available from Waukesha Cherry-Burrell of Delavan, Wis., and the model FT25B scraped surface heat exchanger that is available from Armfield Limited of Ringwood, England.

Figure 2:
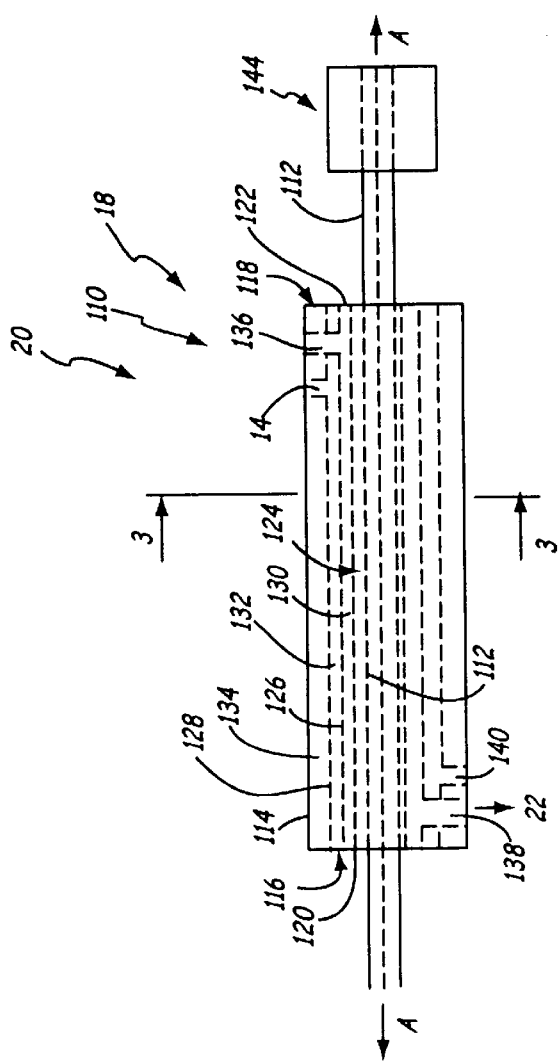
FIG. 2 is a side plan view of a crystallizing apparatus that may be used to produce fat base blends in accordance with the present invention.

A scraped surface heat exchanger that may serve as the crystallizing apparatus 20 is generally depicted at 110 in FIG. 2. The exchanger 110 includes a drive shaft 112 that has a longitudinal axis A. The exchanger 110 has an outer shell 114 that is radially spaced about the shaft 112. The exchanger 110 has both a distal end 116 and a proximal end 118. The exchanger 110 includes an end wall 120 that extends between the outer shell 114 and the shaft 112 at the distal end 116 and additionally includes an end wall 122 that extends between the outer shell 114 and the shaft 112 at the proximal end 118. The end walls 120, 122 are in sealed relationship with the drive shaft 112, but permit rotation of the shaft 112 with respect to the outer shell 114.

The exchanger 110 additionally includes a mutator sleeve 124 that is fixedly mounted on the drive shaft 112. The exchanger 110 further includes a product containment sleeve 126 and a heat transfer medium sleeve 128 that each are connected to, and extend between, the end wall 120 and the end wall 122. The mutator sleeve 124, the product containment sleeve 126 and the end walls 120, 122 collectively define a processing zone 130. Similarly, the product containment sleeve 126 and the heat transfer medium sleeve 128, along with the end walls 120, 122, collectively define a passage 132 for a heat transfer medium (not shown). An insulating material 134 is positioned between, and held in place by, the heat transfer medium sleeve 128 and the outer shell 114.

The exchanger 110 includes a feed inlet 136 and a product outlet 138 that each extend through the outer shell 114 and are each in fluid communication with the processing zone 130. The material to be processed in the exchanger 110 enters the exchanger 110 via the inlet 136, passes through the processing zone 130, and exits the exchanger 110 via the product outlet 138. The exchanger 110 additionally includes a heat transfer medium inlet 140 and a heat transfer outlet 142 that each extend through the outer shell 114 and are in fluid communication with the heat transfer medium passage 132. The heat transfer medium, which is typically a cooling medium, passes through the exchanger 110 in counter-flow fashion by entering the heat transfer medium inlet 140, passing through the passage 132, and exiting the heat transfer medium outlet 142.

Figure 3:
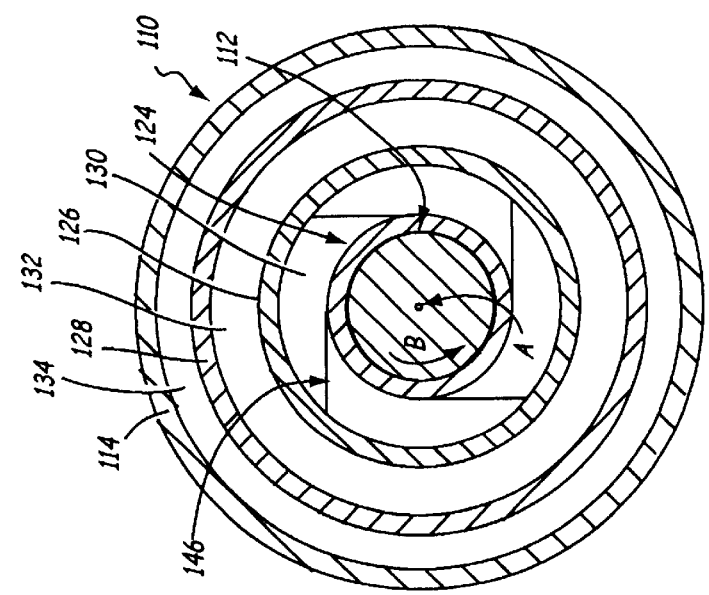
FIG. 3 is an enlarged sectional view through line 3—3 of the crystallizing apparatus depicted in FIG. 2.

The drive shaft 112 is connected to a drive unit or motor 144. The motor 144 causes rotation of the drive shaft 112, and consequently the mutator sleeve 124, with respect to other components of the exchanger 110, such as the outer shell 114, the end walls 120, 122, and the product containment sleeve 126. As best depicted in FIG. 3, a plurality of scraper blades 146 are fixedly mounted on the mutator sleeve 124. The scraper blades 146 rest against the product containment sleeve 126. When the heat transfer medium located in the passage 132 is a cooling medium, the cooling medium tends to cool material that is closest to the product containment sleeve 126 most quickly.

When the motor 144 rotates the shaft 112 in the direction of arrow B, the scraper blades 146 likewise rotate in the direction of arrow B and scrape the surface of the product containment sleeve 126. This scraping action tends to mix the material within the processing zone 130 and consequentially permits substantially or essentially uniform cooling of the material within the processing zone 130. Meanwhile, pressure exerted on the material at the feed inlet 136, as best depicted in FIG. 2, causes movement of the material through the processing zone 130 and toward the product outlet 138. Returning to FIG. 3, the scraper blades 146 may be made of any rigid material that causes the blades 146 to press against the product containment sleeve 126, such as spring steel or certain plastics.

The liquid fat blend 18 is metered into the crystallizing apparatus 20, such as the exchanger 110, through the feed inlet 136 as best depicted in FIG. 2. When desiring to form fat crystalline structures, the temperature of the liquid fat blend 18 upon entering the exchanger 110 may range from about 120° F. to about 170° F. The temperature of the liquid fat blend 18 is preferably about 150° F. or higher to optimally support formation of fat crystal nuclei as the liquid fat blend 18 progresses through the exchanger 110. Simultaneously, the cooling medium (not shown in FIG. 2), such as compressed ammonia or R-22 refrigerant, enters into the exchanger 110 through the heat transfer medium inlet 140, and flows in counter-flow fashion through the heat transfer medium passage 132 with respect to the liquid fat blend 18. R-22 refrigerant is available from Discount Refrigerants, Inc. of Denver, Colo.

The liquid fat blend 18 is mixed in the exchanger 110 by the scraping blades 146 that scrape the surface of the product containment sleeve 126 as the liquid fat blend 18 passes through the processing zone 130 of the exchanger 110. This scraping action by the scraping blades 146 maintains the liquid fat blend 18 as a homogenous blend within the processing zone 130 of the exchanger 110 and thereby promotes uniform cooling of the liquid fat blend 18. The scraping blades 146 preferably rotate about the axis A at speeds ranging from about 275 revolutions per minute to about 550 revolutions per minute to promote fat crystal nuclei formation as the liquid fat blend 18 progresses through the exchanger 110 and homogeneous dispersal of the fat crystal nuclei as the liquid fat blend 18 progresses through the exchanger 110.

The liquid fat blend 18 is preferably cooled to a temperature ranging from about 38° F. to about 90° F. in the processing zone 130 of the exchanger 110 to successfully promote fat crystal nuclei formation in the liquid fat blend 18. More preferably, the liquid fat blend 18 is cooled to a temperature ranging from about 38° F. to about 60° F. in the processing zone 130 of the exchanger 110 to optimize the structure of the fat crystalline matrix that forms in the fat crystalline product, and consequently to optimize the wicking properties of the fat crystalline product by minimizing or preferably eliminating liquid fat wicking from the fat crystalline product. More preferably, the liquid fat blend 18 is cooled to a temperature ranging from about 38° F. to about 50° F. in the processing zone 130 of the exchanger 110 to better optimize the structure of the fat crystalline matrix that forms in the fat crystalline product, and consequently to better optimize the wicking properties of the fat crystalline product by further minimizing or preferably eliminating liquid fat wicking from the fat crystalline product. About 65 British Thermal Units (BTUs) to about 105 BTUs of energy are preferably removed by the exchanger 110, per pound of liquid fat blend 18 passing through the exchanger 110, to promote fat crystal nuclei formation in the liquid fat blend 18.

The flow rate of the liquid fat blend 18 through the processing zone 130 of the exchanger 110 should be rapid enough to successfully promote fat crystal nuclei formation in the liquid fat blend 18. The residence time of the liquid fat blend 18 in the exchanger 110 is preferably about 30 seconds or less to optimize the structure of the fat crystalline matrix that forms in the fat crystalline product, and consequently to optimize the wicking properties of the fat crystalline product by minimizing or preferably eliminating liquid fat wicking from the fat crystalline product. More preferably, the residence time of the liquid fat blend 18 in the exchanger 110 is about 10 seconds to about 30 seconds to better optimize the structure of the fat crystalline matrix that forms in the fat crystalline product, and consequently to better optimize the wicking properties of the fat crystalline product by further minimizing or preferably eliminating liquid fat wicking from the fat crystalline product.

Throughout the drawings, like elements are referred to using like reference characters.

Figure 4:
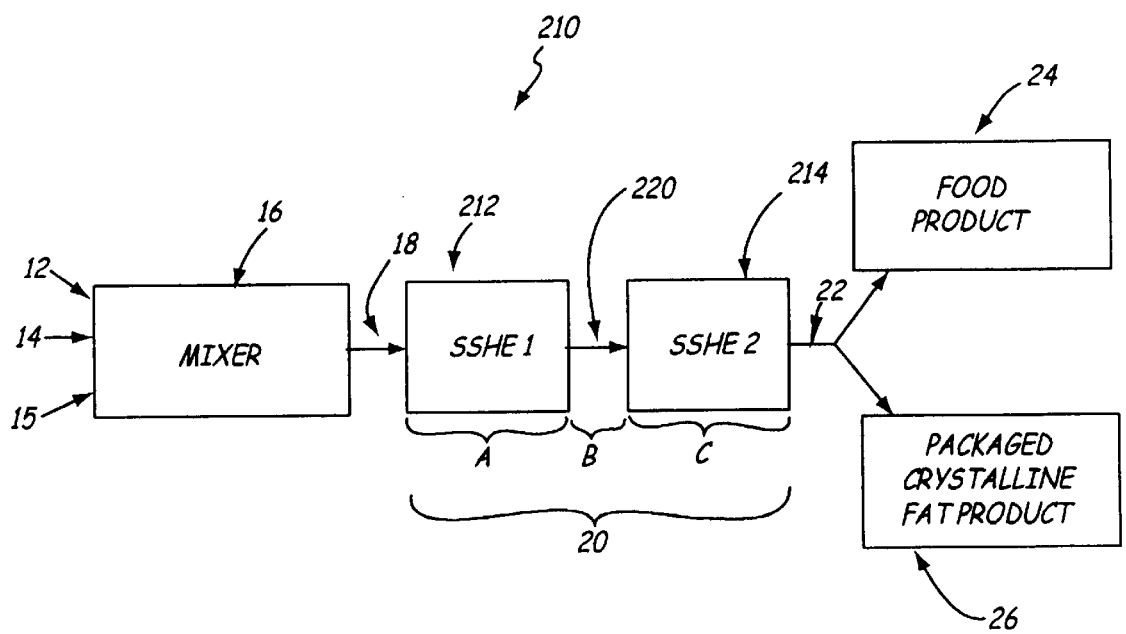
FIG. 4 is a schematic of another process for producing fat base blends in accordance with the present invention.

The nucleated fat base blend 33 may optionally be produced in a an alternative process, as best depicted at 210 in FIG. 4. The process 210 includes the crystallizing apparatus 20 as a pair of exchangers 212, 214 that are arranged in series. Use of the two exchangers 212, 214 often permits quicker cooling of the liquid fat blend 18 and helps to minimize, or even avoid, localized melting of fat crystal nuclei previously formed within the crystallizing apparatus 20. Each of the exchangers 212, 214 may be identical to the exchanger 110 (not shown in FIG. 4). Overall, about 65 British Thermal Units (BTUs) to about 105 BTUs of energy are preferably removed by the exchangers 212, 214, collectively, per pound of nucleated fat base blend 22 that exits the crystallizing apparatus of the process 210.

The first of the exchangers 110 in the process 210, namely the exchanger 212, is used to quickly reduce the temperature of the liquid fat blend 18. The feed, mechanical, operating, and processing details for the liquid fat blend 18 in the exchanger 212 are the same as those presented above for processing the liquid fat blend 18 in the single exchanger 110 of the process 10, with one exception. This exception concerns the residence time of the liquid fat blend 18 in the exchanger 212 (in the processing zone 130 of the exchanger 110) which may be about 15 seconds or less, and is more preferably, about 5 seconds to about 15 seconds, to maximize the rate of heat removal from the liquid fat blend 18. Other processing parameters for the liquid fat blend 18 in the exchanger 212 are the same as those for processing the liquid fat blend 18 in the single exchanger 110 of the process 10. For example, the temperature of the liquid fat blend 18 upon entering the exchanger 212 may range from about 120° F. to about 170° F. The temperature of the liquid fat blend 18 is preferably about 150° F. or higher to optimally support formation of fat crystal nuclei as the liquid fat blend 18 progresses through the exchanger 212. The liquid fat blend 18 that is subjected to heat removal in the exchanger 212 is transformed into an intermediate fat blend 220 that exits the exchanger 212. The exit temperature of the intermediate fat blend 220 from the exchanger 212 may generally range from about 70° F. to about 120° F.

The second of the exchangers 110 in the process 210, namely the exchanger 214, is used to further cool the intermediate fat blend 220 and remove latent heat of fat crystal nuclei that is generated in the intermediate fat blend 220. The mechanical, operating, and processing details for the intermediate fat blend 220 in the exchanger 214 are generally the same as those presented above for processing the liquid fat blend 18 in the single exchanger 110 of the process 10, with a few exceptions. One exception concerns the residence time of the intermediate fat blend 220 in the exchanger 214 (in the processing zone 130 of the exchanger 110), which may be about 15 seconds or less, and is more preferably, about 5 seconds to about 15 seconds, to maximize the rate of heat removal from the intermediate fat blend 220. Also, the inlet temperature of the intermediate fat blend 220 into the exchanger 214 may generally range from about 70° F. to about 120° F.

In the exchanger 214, the intermediate fat blend 220 is transformed into the nucleated fat base blend 22 that exits the exchanger 214. The nucleated fat base blend 22 preferably exits the exchanger 214 at a temperature ranging from about 38° F. to about 90° F. to successfully promote fat crystal nuclei formation in the intermediate fat blend 220. More preferably, the nucleated fat base blend 22 exits the exchanger 214 at a temperature ranging from about 38° F. to about 60° F. to optimize the structure of the fat crystalline matrix that forms in the fat crystalline product, and consequently to optimize the wicking properties of the fat crystalline product by minimizing or preferably eliminating liquid fat wicking from the fat crystalline product. Still more preferably, the nucleated fat base blend 22 exits the exchanger 214 at a temperature ranging from about 38° F. to about 50° F. to better optimize the structure of the fat crystalline matrix that forms in the fat crystalline product, and consequently to better optimize the wicking properties of the fat crystalline product by further minimizing or preferably eliminating liquid fat wicking from the fat crystalline product.

Other than for using the two exchangers 212, 214 in place of the single exchanger 110 as the crystallizing apparatus 20, the processes 10, 210 are the same and each may be used to produce the fat crystalline product of the present invention. The purpose of employing the two exchangers 212, 214 in place of the single exchanger 110 as the crystallizing apparatus 20 in the process 210 is to remove latent heat generated by fat crystal nuclei formation to prevent localized overheating sufficient to melt fat crystal nuclei previously formed in the crystallizing apparatus 20.

The exchanger 212, the route of the intermediate fat blend 220 between the exchanger 212 and the exchanger 214, and the exchanger 214 may be characterized as zones A, B, and C, respectively. In Zone A, fat crystal nuclei are rapidly generated in the liquid fat blend 18. The fat crystal nuclei generation occurs so rapidly in Zone A that all latent heat generated by fat crystal nuclei formation in Zone A may not be removed in Zone A. Absent rapid removal of this latent heat, localized overheating sufficient to melt fat crystal nuclei previously formed in Zone A may occur. Fat crystal nuclei are particularly susceptible to melting upon encountering localized overheated areas due to the small size of the fat crystal nuclei. Further fat crystal nuclei formation may occur in Zone B that may enhance any localized overheating potential. Consequently, the time in Zone B between exit of the intermediate fat blend 220 from the exchanger 212 and passage of te intermediate fat blend 220 into the exchanger 214 is preferably minimized to minimize or eliminate the duration of any overheating potential. Preferably, the time in Zone B between exit of the intermediate fat blend 220 from the exchanger 212 and passage of the intermediate fat blend 220 into the exchanger 214 is about 1 second or less. The localized overheating potential is substantially reduced in the nucleated fat base blend 22, since it is thought that most fat crystal nuclei formation occurs in Zones A and B. Consequently, the supplemental cooling that occurs in Zone C is thought to minimize any need for additional cooling after the nucleated fat base blend 22 exits the exchanger 214 of Zone C.

All streams in the process 10, such as the liquid fat composition 12, the solid fat composition 14, the optional additive(s) 15, the liquid fat blend 18, the nucleated fat base blend 22, the fat crystalline product, and derivatives of any of these streams, are preferably handled carefully in the process 10 to minimize damage to these streams or to any components of these streams. Likewise, all streams in the process 210, such as the liquid fat composition 12, the solid fat composition 14, the optional additive(s) 15, the liquid fat blend 18, the intermediate fat blend 220, the nucleated fat base blend 22, the fat crystalline product, and derivatives of any of these streams, are preferably handled carefully in the process 210 to minimize damage to these streams or to any components of these streams. Careful handling of the process 10 streams and the process 210 streams entails minimizing, and preferably eliminating, any exposure of the process 10 streams and the process 210 streams to any conditions that promote or support fat crystalline structure formation prior to the crystallizing apparatus 20.

In addition, all processing and handling of the process 10 streams and the process 210 streams are preferably done under conditions that minimize the potential for oxidation of these streams, or of components of these streams. Furthermore, transfer of any of the process 10 streams within the process 10 and transfer of any of the process 210 streams within the process 210 is preferably accomplished using a positive displacement pump, such as a lobe-type pump. In addition, gas, such as nitrogen or air, need not be incorporated into any of the process 10 streams or any of the process 210 streams in the course of forming the fat crystalline product of the present invention.

Blanketing of streams in the process 10 and/or streams of the process 210 with inert gases, such as nitrogen, may be used to help minimize the potential for oxidation of these streams, or of components of these streams. However, such blanketing of these streams in the process 10 and/or streams of the process 210 with inert gases may cause a small amount of the blanketing inert gas to become incorporated in these streams, or in components of these streams. Preferably, blanketing of streams in the process 10 and/or streams of the process 210 with inert gases for purposes of minimizing or preventing oxidation is conducted to cause only a de minimis amount of the blanketing inert gas to become incorporated in these streams, or in components of these streams. More preferably, each of the streams in the process 10 and each of the streams in the process 210, including, but not limited to the liquid fat composition 12, the solid fat composition 14, the optional additive(s) 15, the liquid fat blend 18, the intermediate fat blend 220, the nucleated fat base blend 22, the fat crystalline product, and derivatives of any of these streams, are free of any inert gas, such as nitrogen.

The nucleated fat base blend 22 has beneficial processing characteristics when used in food products, such as microwavable popcorn. Food manufacturers, such as microwavable popcorn manufacturers, typically want fat base blends that may be transported via small diameter tubing, such as tubing with an inner diameter of less than about one inch, within food plants. Food manufacturers, such as microwavable popcorn manufacturers, also want fat base blends that remain fluid during transport through small inner diameter tubing to avoid plugging such tubing. The nucleated fat base blend 22 of the present invention meets these criteria of food manufacturers.

The fat profile and composition of the liquid fat base blend 18 may be formulated to provide the nucleated fat base blend 22 with a wide range of different Brookfield viscosities. For example, the liquid fat base blend 18 may be formulated to provide the nucleated fat base blend 22 with a Brookfield viscosity, at a temperature in the range of about 380° F. to about 60° F., that ranges from about 150,000 centipoise, or more, down to about 3,000 centipoise. The nucleated fat base blend 22 preferably has a viscosity within the range of about 38° F. to about 90° F., more preferably within the range of about 38° F. to about 60° F., and still more preferably within the range of about 38° F. to about 50° F., that permits the nucleated fat base blend 22 to be pumped and transported, as a fluid under turbulent flow conditions, through at least about 50 feet, and more preferably about 75 feet, of small inner diameter tubing with an inner diameter of about 1 inch, or less, without plugging the tubing, and into the gravity fed hopper of a metering pump for application to food products in food manufacturing plants.

As one example, the Brookfield viscosity of the nucleated fat base blend 22, upon exiting the crystallizing apparatus 20, preferably ranges from about 3000 centipoise to about 8000 centipoise at a temperature in the range of about 38° F. to about 60° F. and more preferably at a temperature in the range of about 38° F. to about 50° F. In one particularly preferred form, the Brookfield viscosity of the nucleated fat base blend 22, upon exiting the crystallizing apparatus 20, ranges from about 4000 centipoise to about 5500 centipoise at a temperature in the range of about 38° F. to about 60° F. and more preferably at a temperature in the range of about 38° F. to about 50° F. This relatively low viscosity range of about 4000 centipoise to about 5500 centipoise within the range of about 38° F. to about 60° F. permits the nucleated fat base blend 22 to be pumped, as a fluid, through small inner diameter tubing for application in food manufacturing plants to food products at any weight ratio of the nucleated fat base blend 22 to particular food products while generally being high enough to help prevent any significant flow of the nucleated fat base blend 22 off of food products, such as unpopped popcorn kernels, after application of the nucleated fat base blend 22 onto the food products.

When the nucleated fat base blend 22 is included as part of packaged microwavable popcorn product, the nucleated fat base blend 22 may be pumped through small diameter tubing and thereafter introduced into packages (not shown) that already contain microwavable popcorn kernels. The nucleated fat base blend 22 may be introduced into the packages of microwavable popcorn kernels at any weight ratio relative to the microwaveable popcorn kernels, such as at a weight ratio of about 35 parts by weight of nucleated fat base blend 22 to about 65 parts by weight of microwavable popcorn kernels. After the nucleated fat base blend 22 has been introduced into the packages of microwavable popcorn kernels to coat the microwaveable popcorn kernels, the nucleated fat base blend 22 is at rest, or essentially at rest. Consequently, development of fat crystalline structures and the fat crystalline matrix that is based upon the fat crystalline structures proceeds rapidly and the fat crystalline product is consequently formed in the packages of microwavable popcorn kernels.

Additionally, food manufacturers are in need of a fat base blend that (1) exhibits good stability, such as minimal, if any, levels of wicking, (2) exhibits little, if any, waxy mouth-feel during consumption of food products that contain the fat base blend, and (3) contains little, if any, trans-isomers of unsaturated fatty acids. The fat crystalline product that evolves following formation of the nucleated fat base blend 22 meets these additional criteria of food manufacturers.

For example, the fat crystalline product of the present invention exhibits excellent stability characteristics following manufacture. Little, if any, wicking of liquid fat occurs because all, or essentially all, liquid fat components of the nucleated fat base blend 22 are fully entrapped, and thereby physically fixed, within the crystalline matrix of the fat crystalline product. No stains are typically visually observed when the fat crystalline product is placed on paper even after the fat crystalline product has been allowed to rest on the paper for fairly long periods of several hours, such as about 24 hours to about 48 hours. This observation holds true even at elevated temperatures, such as at the elevated temperatures sometimes seen in food storage warehouses. Indeed, when the nucleated fat base blend 22 is placed into packages containing microwavable popcorn kernels and transformed into the fat crystalline product within the packages of microwavable popcorn kernels, little, if any, wicking of liquid fat from the fat crystalline product is typically observed visually after 48 hours at temperatures as high as about 120° F. Thus, no refrigeration is typically required to minimize or eliminate wicking of liquid fat after preparing the fat crystalline product in accordance with the present invention.

The fat crystalline product that is produced in accordance with the present invention generally leaks less than about 2 grams of liquid fat from about 35 grams of the fat crystalline product during a 48 hour period when the fat crystalline product is held at a temperature up to about 72° F., more preferably when the fat crystalline product is held at a temperature ranging up to about 100° F., and still more preferably when the fat crystalline product is held at a temperature ranging up to about 120° F. Preferably, about 35 grams of the fat crystalline product leaks less than about 1 gram of liquid fat during a 48 hour period when the fat crystalline product is held at a temperature up to about 72° F., more preferably when the fat crystalline product is held at a temperature ranging up to about 100° F., and still more preferably when the fat crystalline product is held at a temperature ranging up to about 120° F.

More preferably, less than about 0.5 gram of liquid fat leaks from about 35 grams of the fat crystalline product during a 48 hour period when the fat crystalline product is held at a temperature ranging up to about 72° F., more preferably when the fat crystalline product is held at a temperature ranging up to about 100° F., and still more preferably when the fat crystalline product is held at a temperature ranging up to about 120° F. Still more preferably, less than about 0.1 grams of liquid fat leaks from about 35 grams of the fat crystalline product during a 48 hour period when the fat crystalline product is held at a temperature ranging up to about 72° F., more preferably when the fat crystalline product is held at a temperature ranging up to about 100° F., and still more preferably when the fat crystalline product is held at a temperature ranging up to about 120° F. Most preferably, no detectable amount of liquid fat leaks from about 35 grams of the fat crystalline product during a 48 hour period when the fat crystalline product is held at a temperature ranging up to about 72° F., more preferably when the fat crystalline product is held at a temperature ranging up to about 100° F., and still more preferably when the fat crystalline product is held at a temperature ranging up to about 120° F.

The initial melting point of the fat crystalline product also attests to the excellent stability of the fat crystalline product that may be prepared in accordance with the present invention. The fat crystalline product typically has an initial melting point of at least about 72° F. or more, more preferably has an initial melting point of at least about 100° F. or more, and still more preferably has an initial melting point of at least about 120° F. or more. The initial melting point generally describes the temperature, or temperature range, where a solid fat component of the fat crystalline product initially begins to change from a solid form to a liquid form. The initial melting point thus demonstrates the stability of the fat crystalline product by indicating the temperature at which the fat crystalline product can stand without beginning to melt, and consequently without beginning to release previously entrapped liquid fat components.

Furthermore, the fat crystalline product also possesses excellent nutritional characteristics since the fat crystalline product is derived from the liquid fat composition 12, the solid fat composition 14, and any optional additive(s) 15 that contain little, if any, trans-isomers of unsaturated fatty acids. Consequently, the fat crystalline product contains little, if any, trans-isomers of unsaturated fatty acids. The fat crystalline product also has very good eating characteristics. Little, if any, waxy mouth-feel is experienced when the fat crystalline product, standing alone, is tasted. Furthermore, little if any waxy mouth-feel is experienced by persons consuming food products, such as popped microwavable popcorn, that incorporate the fat crystalline product at any weight ratio, such as at a weight ratio of about 35 parts by weight fat crystalline product to about 65 parts by weight microwavable popcorn kernels.

PROPERTY DETERMINATION AND CHARACTERIZATION TECHNIQUES

Various analytical techniques are employed herein. An explanation of these techniques follows. All values presented in this document for a particular parameter, such as viscosity, are based on the "as is" sample and are therefore on a "wet basis", unless otherwise specified herein.

VISCOSITY

Unless otherwise indicated, all viscosities recited herein may be determined in accordance with the following procedure that uses a RV-Spindle Helipath viscometer. The RV-Spindle Helipath viscometer is available from Brookfield Engineering Laboratories of Middleboro, Mass. and may be obtained with a small sample adaptor.

The Brookfield viscosity of a particular sample may be determined by placing about 100 grams of the sample in the small sample adaptor that is positioned within the viscosity measurement cell of the viscometer. The temperature of the sample may be taken immediately after placement of the sample in the small sample adaptor and subsequently recorded. The viscosity determination should be made quickly to minimize, and preferably eliminate, or essentially eliminate, any change in the temperature of the sample following placement of the sample in the small sample adaptor. The viscosity determination should also be made quickly to minimize, and preferably eliminate, or essentially eliminate, development of fat crystalline structures in the sample following sampling, since placement of the sample in the small sample adaptor and consequent cessation of flow of the sample is conducive to fat crystalline structure formation and development and consequent viscosity enhancement when the sample is taken from the nucleated fat base blend.

A spindle is positioned in the small sample adaptor within the measurement cell immediately after the sample has been placed in the small sample adaptor. The spindle, identified by a spindle designation, is selected so that the measured Brookfield viscosity is within the measurement range of the spindle. The F t-bar spindle that is available from Brookfield Engineering Laboratories, is used as the spindle for determining Brookfield viscosities, unless otherwise indicated. The spindle may be rotated at a rate ranging from about 3 to about 10 revolutions per minute in the small sample adaptor during viscosity determinations.

WICKING

The amount of wicking from a 35 gram sample of a fat material, such as the fat crystalline product, for a selected determination period at a selected determination temperature is determined in accordance with this Wicking Procedure. First, the 35 gram sample of the fat material is placed in an enclosure under a vacuum of about 20 inches of mercury to suction any wickable liquid fat from the fat sample. The vacuum source should be placed beneath the fat sample to allow any wicked liquid fat to fall into a collection dish. The tare wight of the collection dish should be determined prior to starting the wicking determination. The fat sample should be maintained in an enclosure that is adequate to maintain the atmosphere about the fat sample at the selected wicking determination temperature for the duration of the selected determination period. After completion of the selected determination period, the collection dish is weighed and the tare weight of the collection dish is subtracted to determine the amount of liquid fat removed from the fat sample by the applied vacuum. The weight of the liquid fat removed by the applied vacuum (also referred to as "suctioned liquid fat") is then rated based on interpretation standards that are presented in Table 2 below:

TABLE 2

| Rating | Amount of suctioned liquid fat (grams)[#] |
|---|---|
| Good | None |
| Trace | Less than 2 |
| Medium | About 2 to about 5 |
| Large | More than about 5 |

[#]based on a popcorn bag sample containing about 110 grams of a popcorn/fat mixture at a ratio of about 65 parts by weight microwavable popcorn kernels to about 35 parts by weight fat crystalline product.

INITIAL MELTING POINT

The initial melting point of the fat crystalline product may be determined by placing a 5 gram sample of the fat crystalline product that has been previously subjected to the Wicking determination (described immediately above) on a sheet of paper in an oven that is held at a selected determination temperature. The determination period used in the Wicking determination for the fat crystalline product sample that is employed in the Initial Melting Point determination should be 48 hours. The determination temperature used in the Wicking determination for the fat crystalline product sample that is employed in the Initial Melting Point determination should be about 10° F. lower than the determination temperature that is used in the Initial Melting Point determination. The determination temperature used in this Initial Melting Point may be any temperature, such as 72° F., 100° F., or 120° F., for example. Thus, if a 100° F. determination will be used in the Initial Melting Point determination, the determination temperature used in the Wicking determination for the fat crystalline product sample that will be employed in the Initial Melting Point determination temperature should be about 90° F.

If, after a 12 hour period of time in the oven at the selected Initial Melting Point determination temperature, the 5 gram sample of the fat crystalline product has not caused any staining of the paper, the initial melting point of the particular fat crystalline product being tested may be stated as at least about the selected Initial Melting Point determination temperature, or more. If, after the 12 hour period of time in the oven at the selected Initial Melting Point determination temperature, the 5 gram sample of the fat crystalline product has caused staining of the paper, the initial melting point of the particular fat crystalline product being tested may be stated as the selected Initial Melting Point determination temperature, or lower.

WAXY MOUTH-FEEL

Waxy mouth-feel in a sample of the fat crystalline product may be determined after first incorporating the nucleated fat base blend 22 into packages containing microwavable popcorn kernels at a weight ratio of about 35 parts by weight nucleated fat base blend 22 to about 65 parts by weight microwavable popcorn kernels to form a packaged microwavable popcorn product. The packaged microwavable popcorn product is allowed to rest for at least about 10 minutes until the nucleated fat base blend 22 is transformed into the fat crystalline product. The packaged microwavable popcorn product is popped in preparation for subsequent mouth-feel evaluation by a panel of at least 6 trained sensory experts. A control sample of microwavable popcorn that is coated with a prior art fat mixture is popped and evaluated at the same time as the sample of popped microwavable popcorn containing the fat crystalline product. The control sample of microwavable popcorn that is coated with a prior art fat mixture should be known to not exhibit a waxy mouth-feel during consumption.

The popped microwavable popcorn samples and the control sample are evaluated at a relatively high temperature, such as at about 100° F., and at a cooler temperature, such as at about 72° F. If there is no difference in waxy mouth-feel between the control sample and the sample of popped microwavable popcorn that contains the fat crystalline product of the present invention, the fat crystalline product is said to not exhibit any waxy mouth-feel at the selected mouth-feel evaluation temperature.

ANALYSIS FOR TRANS-ISOMERS OF UNSATURATED FATTY ACIDS

The amount of trans-isomers of unsaturated fatty acids in a particular sample and the weight percent of trans-isomers of unsaturated fatty acids in the particular sample may be determined by analyzing the sample in accordance with Method Nos. 969.33 and 963.22 of *Official Methods of Analysis*, Association of Official Analytical Chemists (AOAC) Chapter 41, pp17–19 (16th Ed., 1995), which is hereby incorporated by reference.

The present invention is more particularly described in the following Examples which are intended as illustrations only since numerous modifications and variations within the scope of the present invention will be apparent to those skilled in the art.

EXAMPLES

Example 1

This example illustrates a method of preparing a fat crystalline product in accordance with the present invention. A liquid fat composition and a solid fat composition were introduced into a heated mix tank. The liquid fat composition and the solid fat composition each contained little, if any, trans-isomers of unsaturated fatty acids. The liquid fat composition was Cargill High Oleic CV-65 canola oil, and the solid fat composition was Stable Flake C® cottonseed stearine product. The concentrations and weights of these components in the mix tank are presented in Table 3 below:

TABLE 3

| Components | Weight percent[#] | Weight (lbs.) |
|---|---|---|
| High Oleic CV-65 canola oil | 90.5 | 45.25 |
| Stable Flake C ®cottonseed stearines | 9.5 | 4.75 |

[#]based on total weight of liquid fat composition and solid fat composition added to the mix tank The liquid fat composition and the solid fat composition were homogeneously blended in the heated mix tank and held at a temperature ranging from about 160° F. to about 170° F. in the mix tank to melt solid fat components of the liquid fat composition and to melt solid fat components of the solid fat composition.

A liquid fat blend with all, or essentially all, fat crystalline structures liquified, was then transferred from the mix tank to a Votator® scraped surface heat exchanger. No gas, such as nitrogen or oxygen, was incorporated into the liquid fat blend, components of the liquid fat blend, or derivatives of the liquid fat blend. The liquid fat blend was introduced into the exchanger at a feed rate of about 2.8 pounds of liquid fat blend per minute to begin crystallizing crystallizable components of the liquid fat blend. This feed rate resulted in a residence time ranging from about 20 seconds to about 30 seconds in the exchanger. The scraping blades in the exchanger rotated about the longitudinal axis of the exchanger at about 500 revolutions per minute.

A nucleated fat blend was discharged from the exchanger at an exit temperature ranging from about 38° F. to about 44° F. The Brookfield viscosity of the nucleated fat blend upon exiting the exchanger was determined to be about 4000 centipoise to 5500 centipoise at a temperature ranging from about 38° F. to about 50° F. After exiting the exchanger, the nucleated fat blend was introduced, through about 4 feet of about 0.9 inch inner diameter stainless steel tubing, into the gravity fed hopper of a Hibar Systems 4F-RV metering pump. About 38 grams of the nucleated fat blend was discharged by the 4F-RV metering pump into a package already containing about 70 grams of microwavable popcorn kernels to form a packaged microwavable popcorn product. The packaged microwavable popcorn product was popped about 30 minutes after introduction of the nucleated fat blend. The sensory results were spectacular in that trained sensory experts detected no waxy mouth-feel in the sample of hot popped microwavable popcorn product that incorporated the nucleated fat blend.

Example 2

This example illustrates a method of preparing a fat crystalline product in accordance with the present invention using two swept surface hat exchangers that are connected in series. A liquid fat composition, a solid fat composition, and other additives were introduced into a heated mix tank. The liquid fat composition, the solid fat composition, and the additives contained little, if any, trans-isomers of unsaturated fatty acids. The liquid fat composition was Cargill High Oleic CV-65 canola oil, and the solid fat composition was Stable Flake C® cottonseed stearine product. The weights of the components in the mix tank are presented in Table 4 below:

TABLE 4

| Components | Weight (pounds) |
|---|---|
| High Oleic CV-65 canola oil | 179.37 |
| Stable Flakes C ® cottonseed stearines | 15.615 |
| Partially Hydrolyzed Soybean Oil | 2.25 |
| Land O' Lakes Highfat Butter | 10.935 |
| Salt | 14.9625 |
| Flavor | 1.7325 |
| Yellow Dye No. 6 | 0.11925 |

The liquid fat composition, the solid fat composition, and the additives were homogeneously blended in the heated mix tank and held at a temperature of about 160° F. to about 170° F. in the mix tank to melt any solid fat components of the liquid fat composition, to melt solid fat components of the solid fat composition, and to melt any solid fat components of the additives.

A liquid fat blend with all, or essentially all, fat crystalline structures liquified, was then transferred from the mix tank to the first of a pair of Votator® scraped surface heat exchangers that were connected in series. No gas, such as nitrogen or oxygen, was incorporated into the liquid fat blend, components of the liquid fat blend, or derivatives of the liquid fat blend. The liquid fat blend was processed through each of the exchangers at a feed rate of about 6.2 pounds of liquid fat blend per minute. This feed rate resulted in residence times ranging from about 10 seconds to about 15 seconds in each of the exchangers. The scraping blades in each of the exchangers rotated about the longitudinal axis of the exchangers at about 500 revolutions per minute.

A nucleated fat blend was discharged from the second of the exchangers at an exit temperature of about 50° F. After exiting the second of the exchangers, the nucleated fat blend was introduced, through about 52 feet of about 0.9 inch inner diameter stainless steel tubing, into the gravity fed hopper of a Hibar Systems 4F-RV metering pump. About 38 grams of the nucleated fat blend was discharged by the 4F-RV metering pump into a package already containing about 70 grams of microwavable popcorn kernels to form a packaged microwavable popcorn product.

The Brookfield viscosity of the nucleated fat blend, immediately upon exiting the second of the exchangers, was determined to be about 150,000 centipoises at a temperature ranging from about 50° F. to about 60° F. The viscosity of the nucleated fat blend immediately upon exiting the second of the exchangers and during travel through the stainless steel tubing is believed to have been significantly lower than the 150,000 centipoise viscosity that was measured; it is believed that the relatively high 150,000 centipoise viscosity came about due to extremely rapid development of fat crystalline structures that occurred in the viscosity measurement equipment immediately after sampling. The extremely rapid development of fat crystalline structures in the sample of the nucleated fat blend being analyzed for viscosity is believed to have been triggered by the small amount of partially hydrolyzed soybean oil that was incorporated in the liquid fat blend.

The packaged microwavable popcorn product was first stored at 100° F. for 48 hours, then evaluated for wicking of liquid fat, and then popped for evaluation of waxy mouth-feel. The results of this example were excellent in that zero to only trace amounts of wicked liquid fat were observed in the packaged microwavable popcorn product prior to popping of the popcorn. Furthermore, trained sensory exports detected no waxy mouth-feel in the sample of hot popped microwavable popcorn.

Although the present invention has been described with reference to preferred embodiments, workers skilled in the art will recognize that changes may be made in form and detail without departing from the spirit and scope of the invention.

What is claimed is:

1. A method of processing a liquid fat component and a solid fat component, the method comprising:

heating a mixture to form a liquified fat blend, the mixture comprising the liquid fat component and the solid fat component; and rapidly cooling the liquified fat blend under agitation in a cooling apparatus to form a nucleated fat base blend, the time between entry of the liquified fat blend into the cooling apparatus and exit of the nucleated fat base blend from the cooling apparatus being about 30 seconds, or less.

2. The method of claim 1 wherein the Brookfield viscosity of the nucleated fat base blend when exiting the cooling apparatus ranges from about 4000 centipoise to about 5500 centipoise at a temperature ranging from about 38° F. to about 60° F.

3. The method of claim 1 wherein the cooling apparatus comprises a pair of swept surface heat exchangers that are arranged in series with each other.

4. The method of claim 1 wherein the nucleated fat base blend, at a temperature of the nucleated fat base blend within the range of about 38° F. to about 90° F., is able to be transported, as a fluid under turbulent flow conditions, through at least about 50 feet of small inner diameter tubing with an inner diameter of about 1 inch, or less, without plugging the tubing.

5. The method of claim 1, the method further comprising allowing the nucleated fat base blend to cease flowing after the nucleated fat base blend exits the cooling apparatus, the cessation of flow effective to support growth of fat crystal nuclei of the nucleated fat base blend into fat crystalline structures and consequent transformation of the nucleated fat base blend into a fat crystalline product.

6. The method of claim 5 wherein the fat crystalline product has an initial melting point of at least about 100° F.

7. The method of claim 5 wherein less than about 1 gram of liquid fat leaks from about 35 grams of the fat crystalline product during a 48 hour period when the fat crystalline product is held at a temperature of about 72° F.

8. The method of claim 5 wherein the nucleated fat base blend and the fat crystalline product are free of any inert gas or contain only a de minimis amount of inert gas.

9. The method of claim 5 wherein the fat crystalline product comprises a fat crystalline structure, the fat crystalline structure derived from or comprising a gamma fat crystalline structure.

10. The method of claim 5 wherein the fat crystalline product contains from about 0 grams to about 1 gram of trans-isomers of unsaturated fatty acids per serving of the fat crystalline product, the size of the serving defined by the United States Food and Drug Administration.

11. The method of claim 1, the method further comprising allowing laminar flow of the nucleated fat base blend after the nucleated fat base blend exits the cooling apparatus, the laminar flow effective to support growth of fat crystal nuclei of the nucleated fat base blend into fat crystalline structures and consequent transformation of the nucleated fat base blend into a fat crystalline product.

12. The method of claim 1 wherein the Brookfield viscosity of the nucleated fat base blend when exiting the cooling apparatus ranges from about 3000 centipoise to about 8000 centipoise at a temperature ranging from about 38° F. to about 60° F.

13. The method of claim 1 wherein the liquid fat component or the solid fat component comprises fat derived from an animal fat source.

14. The method of claim 1 wherein the liquid fat component or the solid fat component comprises a fat derived from a genetically-bred fat source, a bio-engineered fat source, or a microbial fat source.

15. The method of claim 1 wherein the liquid fat component or the solid fat component comprises a plant-derived fat, the plant-derived fat being soybean oil, cottonseed oil, corn oil, peanut oil, sunflower oil, safflower oil, olive oil, palm oil, or any of these in any combination.

16. The method of claim 1, the method further comprising transforming the nucleated fat base blend into a fat crystalline product, the fat crystalline product comprising fat crystalline structures, at least one of the fat crystalline structures derived from or comprising a gamma fat crystalline structure.

17. The method of claim 1, the method further comprising packaging the nucleated fat base blend.

18. The method of claim 17 wherein packaging the nucleated fat base blend comprises allowing the nucleated fat base blend to cease flowing after the nucleated fat base blend exits the cooling apparatus, the cessation of flow effective to support growth of fat crystal nuclei of the nucleated fat base blend into fat crystalline structures and consequent transformation of the nucleated fat base blend into a fat crystalline product.

19. The method of claim 1 wherein the Brookfield viscosity of the nucleated fat base blend when exiting the cooling apparatus ranges from about 3000 centipoise to about 150,000 centipoise at a temperature ranging from about 38° F. to about 60° F.

20. A method of processing a liquid fat component and a solid fat component, the method comprising:

heating a mixture to form a liquified fat blend, the mixture comprising the liquid fat component and the solid fat component, and the liquified fat blend containing less than about 0.5 weight percent of trans-isomers of unsaturated fatty acids, based on the total weight of the liquified fat blend;

cooling the liquified fat blend under agitation in a cooling apparatus to form a nucleated fat base blend; and allowing a decrease of, or cessation of, the flow rate of the nucleated fat base blend that is effective to support growth of fat crystal nuclei of the nucleated fat base blend into fat crystalline structures and consequent transformation of the nucleated fat base blend into a fat crystalline product, less than about 1 gram of liquid fat leaking from about 35 grams of the fat crystalline product during a 48 hour period when the fat crystalline product is held at a temperature ranging up to about 72° F.

21. The method of claim 20 wherein the residence time of the liquified fat blend in the cooling apparatus is about 30 seconds, or less.

22. The method of claim 20 wherein the temperature of the nucleated fat base blend immediately after exiting the cooling apparatus ranges from about 38° F. to about 60° F.

23. The method of claim 20 wherein:

the concentration of the liquid fat component in the liquified fat blend ranges from about 82 weight percent to about 90 weight percent, based upon the total weight of the liquified fat blend; and the concentration of the solid fat component in the liquified fat blend is about 10 weight percent, or less, based upon the total weight of the liquified fat blend.

24. The method of claim 20 wherein the fat crystalline product has an initial melting point of at least about 100° F.

25. The method of claim 20 wherein the nucleated fat base blend and the fat crystalline product are free of any inert gas or contain only a de minimis amount of inert gas.

26. The method of claim 20 wherein the fat crystalline product comprises a fat crystalline structure, the fat crystalline structure derived from or comprising a gamma fat crystalline structure.

27. The method of claim 20 wherein the fat crystalline product contains from about 0 grams to about 1 gram of trans-isomers of unsaturated fatty acids per serving of the fat crystalline product, the size of the serving defined by the United States Food and Drug Administration.

28. The method of claim 20 wherein the Brookfield viscosity of the nucleated fat base blend when exiting the cooling apparatus ranges from about 3000 centipoise to about 8000 centipoise at a temperature ranging from about 38° F. to about 60° F.

29. The method of claim 20 wherein the Brookfield viscosity of the nucleated fat base blend when exiting the cooling apparatus ranges from about 4000 centipoise to about 5500 centipoise at a temperature ranging from about 38° F. to about 60° F.

30. The method of claim 20 wherein the nucleated fat base blend, at a temperature of the nucleated fat base blend within the range of about 38° F. to about 90° F., is able to be transported, as a fluid under turbulent flow conditions, through at least about 50 feet of small inner diameter tubing with an inner diameter of about 1 inch, or less, without plugging the tubing.

31. The method of claim 20 wherein the Brookfield viscosity of the nucleated fat base blend when exiting the cooling apparatus ranges from about 3000 centipoise to about 150,000 centipoise at a temperature ranging from about 38° F. to about 60° F.

32. A method of processing a liquid fat component and a solid fat component, the method comprising:
heating a mixture to form a liquified fat blend, the mixture comprising the liquid fat component and the solid fat component;
rapidly cooling the liquified fat blend under agitation in a cooling apparatus to form a nucleated fat base blend, the temperature of the nucleated fat base blend when exiting the cooling apparatus ranging from about 38° F. to about 60° F.; and
packaging the nucleated fat base blend.

33. The method of claim 32, wherein packaging the nucleated fat base blend comprises allowing the nucleated fat base blend to cease flowing after the nucleated fat base blend exits the cooling apparatus, the cessation of flow effective to support growth of fat crystal nuclei of the nucleated fat base blend into fat crystalline structures and consequent transformation of the nucleated fat base blend into a fat crystalline product.

34. The method of claim 33 wherein the fat crystalline product has an initial melting point of at least about 100° F.

35. The method of claim wherein less than about 1 gram of liquid fat leaks from about 35 grams of the fat crystalline product during a 48 hour period when the fat crystalline product is held at a temperature of about 72° F.

36. The method of claim 33 wherein the nucleated fat base blend and the fat crystalline product are free of any inert gas or contain only a de minimis amount of inert gas.

37. The method of claim 33 wherein the fat crystalline product comprises a fat crystalline structure, the fat crystalline structure derived from or comprising a gamma fat crystalline structure.

38. The method of claim 32 wherein the Brookfield viscosity of the nucleated fat base blend when exiting the cooling apparatus ranges from about 3000 centipoise to about 8000 centipoise at a temperature ranging from about 38° F. to about 60° F.

39. The method of claim 32 wherein the Brookfield viscosity of the nucleated fat base blend when exiting the cooling apparatus ranges from about 4000 centipoise to about 5500 centipoise at a temperature ranging from about 38° F. to about 60° F.

40. The method of claim 32 wherein the liquid fat component or the solid fat component comprises fat derived from an animal fat source.

41. The method of claim 32 wherein the liquid fat component or the solid fat component comprises a fat derived from a genetically-bred fat source, a bio-engineered fat source, or a microbial fat source.

42. The method of claim 32 wherein the liquid fat component or the solid fat component comprises a plant-derived fat, the plant-derived fat being soybean oil, cottonseed oil, corn oil, peanut oil, sunflower oil, safflower oil, olive oil, palm oil, or any of these in any combination.

43. The method of claim 32 wherein the nucleated fat base blend, at a temperature of the nucleated fat base blend within the range of about 38° F. to about 90° F., is able to be transported, as a fluid under turbulent flow conditions, through at least about 50 feet of small inner diameter tubing with an inner diameter of about 1 inch, or less, without plugging the tubing.

44. The method of claim 32 the method further comprising transforming the nucleated fat base blend into a fat crystalline product, the fat crystalline product comprising fat crystalline structures, at least one of the fat crystalline structures derived from or comprising a gamma fat crystalline structure.

45. A fat crystalline material, the fat crystalline material comprising:
a liquid fat component, the concentration of the liquid fat component in the fat crystalline material ranging from about 82 weight percent to about 90 weight percent, based upon the total weight of the fat crystalline material;
a solid fat component, the concentration of the solid fat component in the fat crystalline material being about 10 weight percent, or less, based upon the total weight of the fat crystalline material, the solid fat component comprising fat crystalline structures that entrap the liquid fat component; and
wherein less than about 1 gram of liquid fat leaks from about 35 grams of the fat crystalline material during a 48 hour period when the fat crystalline material is held at a temperature of about 72° F.

46. The fat crystalline material of claim 45 wherein the fat crystalline material has an initial melting point of at least about 100° F.

47. The fat crystalline material of claim 45 wherein the fat crystalline material is free of any inert gas or contains only a de minimis amount of inert gas.

48. The fat crystalline material of claim 45 wherein at least one of the fat crystalline structures is derived from or comprises a gamma fat crystalline structure.

49. The fat crystalline material of claim 45 wherein the liquid fat component or the solid fat component comprises fat derived from an animal fat source.

50. The fat crystalline material of claim 45 wherein the liquid fat component or the solid fat component comprises a fat derived from a genetically-bred fat source, a bio-engineered fat source, or a microbial fat source.

51. The fat crystalline material of claim 45 wherein the liquid fat component or the solid fat component comprises a plant-derived fat, the plant-derived fat being soybean oil, cottonseed oil, corn oil, peanut oil, sunflower oil, safflower oil, olive oil, palm oil, or any of these in any combination.

52. A nucleated fat base blend, the nucleated fat base blend comprising:
a liquid fat component;
a solid fat component, the solid fat component comprising fat crystal nuclei; and
wherein the temperature of the nucleated fat base blend ranges from about 38° F. to about 60° F.

53. The nucleated fat base blend of claim 52 wherein the Brookfield viscosity of the nucleated fat base blend ranges from about 4000 centipoise to about 5500 centipoise at a temperature ranging from about 38° F. to about 60° F.

54. A fat crystalline material, the fat crystalline material based upon the nucleated fat base blend of claim 53 the fat crystalline material comprising:
the liquid fat component; and
the solid fat component, the solid fat component comprising fat crystalline structures that entrap the liquid fat component.

55. The fat crystalline material of claim 54 wherein the fat crystalline material has an initial melting point of at least about 100° F.

56. The fat crystalline material of claim 54 wherein less than about 1 gram of liquid fat leaks from about 35 grams of the fat crystalline material during a 48 hour period when the fat crystalline material is held at a temperature of about 72° F.

57. The fat crystalline material of claim 54 wherein at least one of the fat crystalline structures is derived from or comprises a gamma fat crystalline structure.

58. The fat crystalline material of claim 54 wherein the fat crystalline material contains from about 0 grams to about 1 gram of trans-isomers of unsaturated fatty acids per serving of the fat crystalline material, the size of the serving defined by the United States Food and Drug Administration.

59. The nucleated fat base blend of claim 52 wherein the nucleated fat base blend, at a temperature of the nucleated fat base blend within the range of about 38° F. to about 90° F., is transportable, as a fluid under turbulent flow conditions, through at least about 50 feet of small inner diameter tubing with an inner diameter of about 1 inch, or less, without plugging the tubing.

60. The nucleated fat base blend of claim 52 wherein the nucleated fat base blend is at rest, the resting state of the nucleated fat base blend effective to support growth of the fat crystal nuclei of the nucleated fat base blend into fat crystalline structures and consequent transformation of the nucleated fat base blend into a fat crystalline product.

61. The nucleated fat base blend of claim 52 wherein the nucleated fat base blend is flowing at a laminar rate, the laminar rate flow of the nucleated fat base blend effective to support growth of the fat crystal nuclei of the nucleated fat base blend into fat crystalline structures and consequent transformation of the nucleated fat base blend into a fat crystalline product.

62. The nucleated fat base blend of claim 52 wherein the liquid fat component or the solid fat component comprises fat derived from an animal fat source.

63. The nucleated fat base blend of claim 52 wherein the liquid fat component or the solid fat component comprises a fat derived from a genetically-bred fat source, a bio-engineered fat source, or a microbial fat source.

64. The nucleated fat base blend of claim 52 wherein the liquid fat component or the solid fat component comprises a plant-derived fat, the plant-derived fat being soybean oil, cottonseed oil, corn oil, peanut oil, sunflower oil, safflower oil, olive oil, palm oil, or any of these in any combination.

65. The nucleated fat base blend of claim 52 wherein the nucleated fat base blend is in a package.

66. The nucleated fat base blend of claim 55 wherein the nucleated fat base blend is at rest and is not flowing, the cessation of flow effective to support growth of fat crystal nuclei of the nucleated fat base blend into fat crystalline structures and consequent transformation of the nucleated fat base blend into a fat crystalline product.

67. The nucleated fat base blend of claim 52 wherein the Brookfield viscosity of the nucleated fat base blend ranges from about 3000 centipoise to about 150000 centipoise at a temperature ranging from about 38° F. to about 60° F.

68. A fat crystalline material, the fat crystalline material comprising:
a liquid fat component, the concentration of the liquid fat component in the fat crystalline material ranging from about 82 weight percent to about 90 weight percent, based upon the total weight of the fat crystalline material;
a solid fat component, the concentration of the solid fat component in the fat crystalline material being about 10 weight percent, or less, based upon the total weight of the fat crystalline material, the solid fat component comprising fat crystalline structures that entrap the liquid fat component; and
wherein the fat crystalline material has an initial melting point of at least about 100° F.

69. The fat crystalline material of claim 68 wherein the liquid fat component or the solid fat component comprises fat derived from an animal tat source.

70. The fat crystalline material of claim 68 wherein the liquid fat component or the solid fat component comprises a fat derived from a genetically-bred fat source, a bio-engineered fat source, or a microbial fat source.

71. The fat crystalline material of claim 68 wherein the liquid fat component or the solid fat component comprises a plant-derived fat, the plant-derived fat being soybean oil, cottonseed oil, corn oil, peanut oil, sunflower oil, safflower oil, olive oil, palm oil, or any of these in any combination.

72. The fat crystalline material of claim 43 wherein at least one of the fat crystalline structures is derived from or comprises a gamma fat crystalline structure.

73. A nucleated fat base blend, the nucleated fat base blend comprising:
a liquid fat component;
a solid fat component, the solid fat component comprising fat crystal nuclei; and
wherein the Brookfield viscosity of the nucleated fat base blend ranges from about 3000 centipoise to about 150,000 centipoise at a temperature of the nucleated fat base blend ranging from about 38° F. to about 60° F.

74. The nucleated fat base blend of claim 73 wherein the Brookfield viscosity of the nucleated fat base blend ranges from about 3000 centipoise to about 8,000 centipoise at a temperature of the nucleated fat base blend ranging from about 38° F. to about 60° F.

75. The nucleated fat base blend of claim 74 wherein the Brookfield viscosity of the nucleated tat base blend ranges from about 4000 centipoise to about 5500 centipoise at a temperature of the nucleated fat base blend ranging from about 38° F. to about 60° F.

76. A method of processing a liquid fat component and a solid fat component, the method comprising:
heating a mixture to form a liquified fat blend, the mixture comprising the liquid fat component and the solid fat component, and the liquified fat blend containing less than about 0.5 weight percent of trans-isomers of unsaturated fatty acids, based on the total weight of the liquified fat blend;
cooling the liquified fat blend under agitation in a cooling apparatus to form a nucleated fat base blend; and
allowing growth of fat crystal nuclei of the nucleated fat base blend into fat crystalline structures and consequent transformation of the nucleated fat base blend into a fat crystalline product, less than about 2 grams of liquid fat leaking from about 35 grams of the fat crystalline product during a 48 hour period when the fat crystalline product is held at a temperature ranging up to about 72° F.

77. The method of claim 76 wherein the nucleated fat base blend, at a temperature of the nucleated fat base blend within the range of about 38° F. to about 90° F., is able to be transported, as a fluid under turbulent flow conditions, through at least about 50 feet of small inner diameter tubing with an inner diameter of about 1 inch, or less, without plugging the tubing.

78. The method of claim 76 wherein less than about 2 grams of liquid fat leak from about 35 grams of the fat crystalline product during a 48 hour period when the fat crystalline product is held at a temperature ranging up to about 120° F.

79. The method of claim 76 wherein less than about 1 gram of liquid fat leaks from about 35 grams of the fat crystalline product during a 48 hour period when the fat crystalline product is held at a temperature ranging up to about 72° F.

80. The method of claim 76 wherein less than about 1 gram of liquid fat leak from about 35 grams of the fat crystalline product during a 48 hour period when the fat crystalline product is held at a temperature ranging up to about 120° F.

81. The method of claim 76 wherein less than about 0.5 grams of liquid fat leak from about 35 grams of the fat crystalline product during a 48 hour period when the fat crystalline product is held at a temperature ranging up to about 72° F.

82. The method of claim 76 wherein less than about 0.5 grams of liquid fat leak from about 35 grams of the fat crystalline product during a 48 hour period when the fat crystalline product is held at a temperature ranging up to about 120° F.

83. The method of claim 76 wherein less than about 0.1 grams of liquid fat leak from about 35 grams of the fat crystalline product during a 48 hour period when the fat crystalline product is held at a temperature ranging up to about 72° F.

84. The method of claim 76 wherein less than about 0.1 grams of liquid fat leak from about 35 grams of the fat crystalline product during a 48 hour period when the fat crystalline product is held at a temperature ranging up to about 120° F.

85. The method of claim 76 wherein the fat crystalline product is free of any inert gas or contains only a de minimis amount of inert gas.

86. The method of claim 76 wherein the liquid fat component or the solid fat component comprises fat derived from an animal fat source.

87. The method of claim 76 wherein the liquid fat component or the solid fat component comprises a marine oil.

88. The method of claim 76 wherein the liquid fat component or the solid fat component comprises a fat derived from a genetically-bred fat source, a bio-engineered fat source, or a microbial fat source.

89. The method of claim 76 wherein the liquid fat component or the solid fat component comprises a plant-derived fat, the plant-derived fat being soybean oil, cottonseed oil, corn oil, peanut oil, sunflower oil, safflower oil, olive oil, palm oil, or any of these in any combination.

90. A fat crystalline material, the fat crystalline material based upon a nucleated fat base blend that comprises a liquid fat component and a solid fat component, the solid fat component comprising fat crystal nuclei, the fat crystalline material comprising:
  the liquid fat component; and
  the solid fat component, the solid fat component comprising fat crystalline structures that entrap the liquid fat component, at least one of the fat crystalline structures derived from a gamma fat crystalline structure.

91. A fat crystalline material, the fat crystalline material based upon a nucleated fat base blend that comprises a liquid fat component and a solid fat component, the solid fat component comprising fat crystal nuclei, the fat crystalline material comprising:
  the liquid fat component; and
  the solid fat component, the solid fat component comprising fat crystalline structures that entrap the liquid fat component, at least one of the fat crystalline structures comprising a gamma fat crystalline structure.

92. A method of processing a liquid fat component and a solid fat component, the method comprising:
  heating a mixture to form a liquified fat blend, the mixture comprising the liquid fat component and the solid fat component;
  rapidly cooling the liquified fat blend under agitation in a cooling apparatus to form a nucleated fat base blend, the temperature of the nucleated fat base blend when exiting the cooling apparatus ranging from about 38° F. to about 60° F.; and
  allowing laminar flow of the nucleated fat base blend after the nucleated fat base blend exits the cooling apparatus, the laminar flow effective to support growth of fat crystal nuclei of the nucleated fat base blend into fat crystalline structures and consequent transformation of the nucleated fat base blend into a fat crystalline product.

93. A method of processing a liquid fat component and a solid fat component, the method comprising:
  heating a mixture to form a liquified fat blend, the mixture comprising the liquid fat component and the solid fat component;
  rapidly cooling the liquified fat blend under agitation in a cooling apparatus to form a nucleated fat base blend, the temperature of the nucleated fat base blend when exiting the cooling apparatus ranging from about 38° F. to about 60° F.; and
  allowing a decrease of, or cessation of, the flow rate of the nucleated fat base blend that is effective to support growth of fat crystal nuclei of the nucleated fat base blend into fat crystalline structures and consequent transformation of the nucleated fat base blend into a fat crystalline product, less than about 1 gram of liquid fat leaking from about 35 grams of the fat crystalline product during a 48 hour period when the fat crystalline product is held at a temperature of about 72° F.

94. A method of processing a liquid fat component and a solid fat component, the method comprising:
  heating a mixture to form a liquified fat blend, the mixture comprising the liquid fat component and the solid fat component;
  rapidly cooling the liquified fat blend under agitation in a cooling apparatus to form a nucleated fat base blend, the temperature of the nucleated fat base blend when exiting the cooling apparatus ranging from about 38° F. to about 60° F.; and
  allowing a decrease of, or cessation of, the flow rate of the nucleated fat base blend that is effective to support growth of fat crystal nuclei of the nucleated fat base blend into fat crystalline structures and consequent transformation of the nucleated fat base blend into a fat crystalline product, the fat crystalline structure derived from or comprising a gamma fat crystalline structure.

95. A method of processing a liquid fat component and a solid fat component, the method comprising:

heating a mixture to form a liquified fat blend, the mixture comprising the liquid fat component and the solid fat component; and rapidly cooling the liquified fat blend under agitation in a cooling apparatus to form a nucleated fat base blend wherein:

the temperature of the nucleated fat base blend when exiting the cooling apparatus ranges from about 38° F. to about 60° F.; and the Brookfield viscosity of the nucleated fat base blend when exiting the cooling apparatus ranging from about 3000 centipoise to about 150,000 centipoise at a temperature ranging from about 38° F. to about 60° F.

96. The method of claim 95 wherein the Brookfield viscosity of the nucleated fat base blend when exiting the cooling apparatus ranges from about 3000 centipoise to about 8000 centipoise at a temperature ranging from about 38° F. to about 60° F.

97. The method of claim 95 wherein the Brookfield viscosity of the nucleated fat base blend when exiting the cooling apparatus ranges from about 4000 centipoise to about 5500 centipoise at a temperature ranging from about 38° F. to about 60° F.

98. A method of processing a liquid fat component and a solid fat component, the method comprising:

heating a mixture to form a liquified fat blend, the mixture comprising the liquid fat component and the solid fat component; and rapidly cooling the liquified fat blend under agitation in a cooling apparatus to form a nucleated fat base blend wherein:

the temperature of the nucleated fat base blend when exiting the cooling apparatus ranges from about 38° F. to about 60° F.; and the nucleated fat base blend, at a temperature of the nucleated fat base blend within the range of about 38° F. to about 90° F., is transportable, as a fluid under turbulent flow conditions, through at least about 50 feet of small inner diameter tubing with an inner diameter of about 1 inch, or less, without plugging the tubing.

99. A method of processing a liquid fat component and a solid fat component, the method comprising:

heating a mixture to form a liquified fat blend, the mixture comprising the liquid fat component and the solid fat component;

rapidly cooling the liquified fat blend under agitation in a cooling apparatus to form a nucleated fat base blend, the temperature of the nucleated fat base blend when exiting the cooling apparatus ranging from about 38° F. to about 60° F.; and transforming the nucleated fat base blend into a fat crystalline product, the fat crystalline product comprising fat crystalline structures, at least one of the fat crystalline structures derived from or comprising a gamma fat crystalline structure.

* * * * *

UNITED STATES PATENT AND TRADEMARK OFFICE
CERTIFICATE OF CORRECTION

PATENT NO. : 6,544,579 B1
DATED : April 8, 2003
INVENTOR(S) : Todd Landon

It is certified that error appears in the above-identified patent and that said Letters Patent is hereby corrected as shown below:

Column 23,
Line 44, delete "claim wherein", and insert -- claim 33 wherein -- therefor.

Signed and Sealed this

Twenty-eighth Day of September, 2004

JON W. DUDAS
*Director of the United States Patent and Trademark Office*